US011151608B1

(12) United States Patent
Guo et al.

(10) Patent No.: US 11,151,608 B1
(45) Date of Patent: Oct. 19, 2021

(54) ITEM RECOMMENDATIONS THROUGH CONCEPTUAL RELATEDNESS

(71) Applicant: Amazon Technologies, Inc., Seattle, WA (US)

(72) Inventors: Xuan Guo, Seattle, WA (US); Gaurav Chanda, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,680

(22) Filed: Sep. 30, 2019

(51) Int. Cl.
*G06Q 30/02* (2012.01)
*G06Q 30/06* (2012.01)

(52) U.S. Cl.
CPC ..... *G06Q 30/0255* (2013.01); *G06Q 30/0277* (2013.01); *G06Q 30/0631* (2013.01)

(58) Field of Classification Search
CPC .......... G06Q 30/0255; G06Q 30/0277; G06Q 30/0631
USPC ............................................. 705/7.11, 14.53
See application file for complete search history.

(56) References Cited

U.S. PATENT DOCUMENTS

| 7,542,951 B1 | 6/2009 | Chakrabarti et al. | |
| 8,438,052 B1 * | 5/2013 | Chanda | G06Q 30/0207 |
| | | | 705/7.11 |
| 2016/0378757 A1 | 12/2016 | Bahl | |

FOREIGN PATENT DOCUMENTS

CA    2606448 A1 *   4/2009   ............. G06Q 10/00

OTHER PUBLICATIONS

Siva Kumar Cheekula, Characterizing Concepts in Taxonomy for Entity Recommendations, 2017 (Year: 2017).*
Bhagat et al., "Buy It Again: Modeling Repeat Purchase Recommendations", Applied Data Science Track Paper, KDD 2018, Aug. 19-23, 2018, pp. 62-70.
Linden et al., "Amazon.com Recommendations Item-to-Item Collaborative Filtering", IEEE Internet Computing, Institute of Electrical and Electronics Engineers, vol. 7, No. 1, Jan.-Feb. 2003, pp. 76-80.
Mikolov et al., "Efficient Estimation of Word Representations in Vector Space", Proceedings of the International Conference on Learning Representations, Jan. 16, 2013, 9 pages.

* cited by examiner

*Primary Examiner* — Tarek Elchanti
(74) *Attorney, Agent, or Firm* — Kilpatrick Townsend & Stockton LLP

(57) ABSTRACT

Techniques are provided for determining that an item should be provided for presentation to a user based on an item concept relatedness score. For example, a computer system may partition a plurality of items into a plurality of item concepts, whereby each item is assigned to one and only one item concept. The computer system may receive a list of co-selected items, whereby each item of the list is assigned to an item concept. Based at least in part on this list, the system may determine an item concept relatedness score between a first item concept and a second item concept of the plurality of item concepts. The computer system may then receive a selection of a first item assigned to a first item concept. Based at least in part on the item concept relatedness score, the system may provide the second item for presentation to a user.

21 Claims, 8 Drawing Sheets

ITEM RECOMMENDATIONS THROUGH CONCEPTUAL RELATEDNESS

BACKGROUND

As more content has been published online, it has become increasingly challenging for users to easily find the content that they are looking for. For example, a user may input a search query online for a particular item, expecting relevant results to be returned. However, despite efforts to improve recommendation systems, on-line systems may return results that are over-inclusive or under-inclusive of what the user expects or desires. Therefore, there is a need for improving recommendation systems to provide more relevant content to users.

BRIEF DESCRIPTION OF THE DRAWINGS

Various embodiments in accordance with the present disclosure will be described with reference to the drawings, in which.

DETAILED DESCRIPTION

Figure 1:
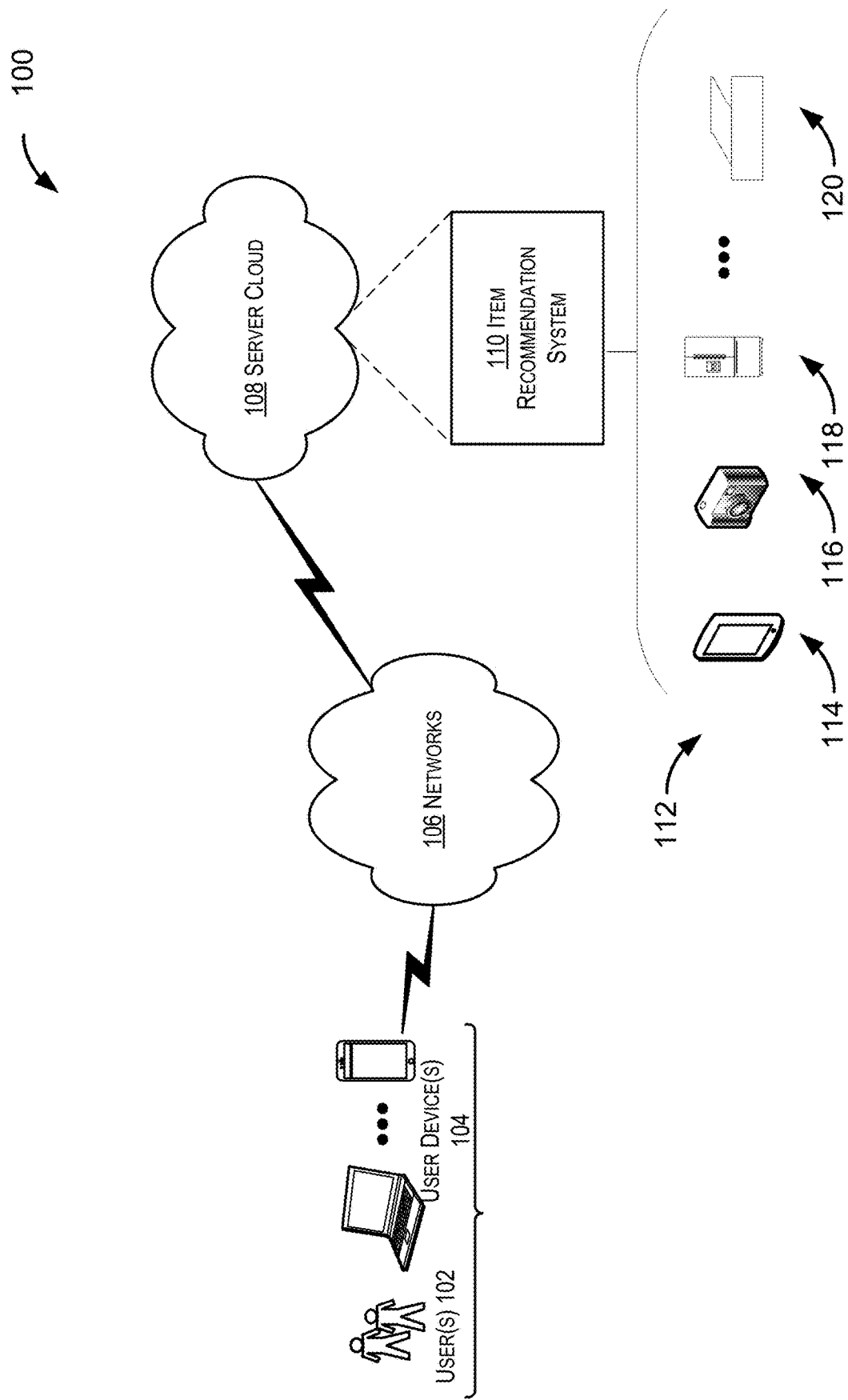
FIG. 1 illustrates a system depicting example interactions between a user and a recommendation system, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a computer system that provides content (e.g., representations of "items" such as a merchandise, products or services that may be physical, digital and/or virtual, and/or search results pertaining thereto) for presentation to a user based at least in part on determining an item concept relatedness score. As discussed in more detail below, an "item concept" may correspond to a non-hierarchical taxonomy for item abstractions, whereby the taxonomy is determined according to a level of item abstraction that may be conceptualized as a discrete item category (e.g., product category) among other item categories. An item concept may be selected such that it is neither too generic (e.g., an assortment of product types) nor too product specific (e.g., a product sub-type with specific attributes). According to embodiments, a non-hierarchical taxonomy of item concepts may be determined (e.g., derived or extracted) from a hierarchical taxonomy of item categories such that the set of item concepts partitions the concept space into non-overlapping item concepts. In this way, a computer system may classify and compare items at an appropriate taxonomical level when determining whether or not to recommend (e.g., present) an item.

In an embodiment, the computer system first partitions a plurality of items into a plurality of item concepts. The computer system then determines an item concept relatedness score that corresponds to a relatedness between a first item concept and a second item concept of the plurality of item concepts. In some embodiments, this item concept relatedness score may be determined by computing a conditional probability between the first item concept and the second item concept based at least in part on item relatedness data. For example, the item relatedness data may correspond to a list of previously co-selected items (e.g., two or more items that a user previously purchased together as a bundle), whereby each item of a particular co-selection of the list is assigned to an item concept. The computer system may then receive a user selection of a first item that is assigned to the first item concept. Then, based at least in part on the item concept relatedness score, the computer system may determine that a second item assigned to the second item concept should (or should not) be provided for presentation to the user in response to the selection.

In an illustrative example, consider a scenario in which a merchant application executing on a user device (e.g., a mobile phone) receives input from a user corresponding to a selection of an item to purchase (e.g., a particular shampoo). The user device may transmit the selection over a network to a recommendation computing system of the merchant. In this example, as part of the shopping experience, the recommendation system may be configured to recommend complementary items that other users have previously purchased and that the user may want to bundle together with the selected item. In one embodiment, the recommendation system has assigned each item within the merchant's shopping catalog to a particular item concept. The recommendation system first determines a first item concept to which the selected shampoo item is assigned. For example, the first item concept may be labeled as "Shampoos." The recommendation system then determines a list of items previously purchased by users (e.g., a light emitting diode (LED) television (TV), a rinse-out hair conditioner, etc.). For each of these items, the recommendation system may retrieve item concept assignments. For example, the LED TV may be assigned to a "Televisions" item concept, while the rinse-out hair conditioner may be assigned to a "Hair Conditioners" item concept. The recommendation system then determines an item concept relatedness score, respectively, between the Shampoos item concept and the Television item concept, and the Shampoos item concept and the Hair Conditioner item concept. For example, the item concept relatedness score between Shampoos and Hair Conditioners may correspond to a higher likelihood that a user would want to purchase an item assigned to the Hair Conditioners item concept together with an item assigned to the Shampoos item concept. In this example, the score may be expressed as a conditional probability (e.g., a probability of purchasing an item assigned to the Hair Conditioners item concept, given a purchase of an item assigned to the Shampoos item concept) and may be determined based at least in part on a corpus of item bundling purchase data over a plurality of users. For example, in this case, the score (e.g., a number between 0 and 1) may be high (e.g., 0.95), corresponding to a high level of relatedness. This may indicate that users associate a high level of conceptual relatedness between the item concepts labeled Hair Conditioners and Shampoos. The recommendation system may then determine a similar item concept relatedness score with respect to Shampoos and Televisions, and so on, for each item concept corresponding to a previously purchased item by the user. Note that in this case, the score may be lower (e.g., 0.35). The recommendation system may then determine to recommend bundling a particular hair conditioner (assigned to the Hair Conditioners item concept) previously purchased by the user with the selected shampoo based at least in part on the higher item concept relatedness score. Also, the recommendation system may determine to not recommend bundling a particular television previously purchased by the user with the selected shampoo based at least in part on the lower item concept relatedness score.

The embodiments of the present disclosure may provide many technological benefits over existing systems. In one example, existing recommendation systems may provide recommendations to users that are not personalized. For example, a conventional recommendation system may recommend to bundle one or more items with a selected item based on other consumer behavior across a whole population. Continuing with the example above, other users in a user population who have bought a particular shampoo item may have also bought another type of shampoo item, and/or a certain perfume. However, these items may not be as relevant to the user for this purchase. For example, the user may not want to bundle two different shampoos within the same purchase (e.g., but instead may be interested in complementary items). Also, the user may not be interested in the perfume that other users prefer, who also happen buy this shampoo. It should also be understood that conventional recommendation systems may rely on a hierarchical taxonomy of item categories, which may result in items being recommended that are less relevant to users. For example, the system may recommend the perfume to the user, in part, because both the perfume and the shampoo fall within a higher-level category "Beauty & Personal Care."

In contrast, embodiments of the present disclosure enable a recommendation system to provide relevant recommendations by utilizing an item concept relatedness score computed using a non-hierarchical item concept taxonomy. In this way, a recommendation system classifies and compares relatedness between item concepts at an appropriate level of taxonomy (e.g., neither overly generic nor too item specific) when making recommendations. For example, the recommendation system may utilize a user's previous purchases to determine items for which the user may likely buy again. To narrow down this list, as illustrated above, the system may determine that an item categorized as a Hair Conditioners item concept is highly related to an item categorized as a Shampoos item concept (e.g., and therefore may be a good candidate for bundling), but items categorized as a Televisions item concept or a "Perfumes" item concept may not be as related to items categorized as Shampoos item concept (e.g., not good candidates for bundling). Also, the system may determine that other shampoos that belong to the same item concept as "Shampoos" therefore are not likely to be bundled within the same purchase or a subsequent purchase in the near future (e.g., since the user may not be likely to need a replacement or substitute soon, such as within 1-7 days).

By providing more relevant results to users, the system may decrease computing and logistics resources used for consumer purchases. For example, users may spend less time browsing through online items, which enables the system to consume less memory and processing power. Additionally, by providing more relevant bundling recommendations, the system may improve resource (e.g., packaging, handling and fuel, etc.) utilization by reducing shipping costs, for example by combining shipments.

In another example, a new item may recently have been released on the market, for which there may not be many data points of previous purchases by users in the population. Under conventional systems, the new items may not be recommended to the user for bundling with another item due in part to lack of available item relatedness data. However, by using an item concept relatedness score, the new item may still be recommended for a bundled purchase by the user. For example, by computing relatedness on an item concept level instead of an item level, the new item that is mapped to an item concept may still be recommended for bundling if the item concept is highly related to the item concept of the item that the user has selected.

In the interest of clarity of explanation, the embodiments of the present disclosure may be described primarily in connection with bundling recommendations (e.g., for purchasing complementary items) based at least in part on an item concept relatedness score. However, the embodiments are not limited as such. Instead, an item concept relatedness score may be utilized in a variety of contexts. For example, an item concept relatedness score may be used to determine presentation of items that should be paired together for side-by-side comparison (e.g., comparing alternative/substitute items while browsing). In yet another example, embodiments of the present disclosure may apply to improving relevant search results. For example, a search recommendation system is trained to receive as input a search query and output one or more related item concepts. Based at least in part on these item concepts, less relevant search results (e.g., product recommendations) are filtered out that don't match the outputted item concepts (or vice versa).

FIG. 1 illustrates example interactions between a user and a recommendation system, in accordance with various embodiments. The system 100 is configured to receive search requests from one or more users 102 using one or more user devices 104 over a network environment 106 to a server cloud 108. The one or more users 102 may each respectively operate a user device 104. (As used herein and for clarity of explanation, the one or more users 102 may interchangeably be referred to as a single user 102.) Each user device 104 may receive user input (e.g., an item selection), upon which the item selection may be transmitted over the network 106 to the server cloud 108. The server cloud 108 may operate an item recommendation system 110, which may provide item recommendations to the user 102. In some embodiments, the item recommendation system 110 may receive input from the user 102 and determine an item concept relatedness score. Then, based at least in part on the item concept relatedness score, the item recommendation system 110 may determine to provide (or not provide) an item for presentation to the user (e.g., via the network 106).

In some embodiments, user device 104 may correspond to any suitable electronic device that may be operated by a user 102 having remote communication capabilities to the network 106. For example, a user device 104 may be a personal computer (PC). A "mobile communication device" may be an example of a "user device" that can be easily transported. Examples of remote communication capabilities include exchanging data between devices over short ranges (e.g., using a Bluetooth standard). Other examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), key fobs, PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities.

In some embodiments, user input may be received may be received via one or more mechanisms. For example, the user device 104 may receive a voice query from the user that contains one or more words. In another embodiments, the user device may receive a click (or tap) on a graphical user interface (GUI) which indicates that the user selects an item on the screen (e.g., to add to a shopping cart.). In yet another example, the user device 104 may receive multiple words via keyboard input as a search query. Any suitable input mechanism may be used to perform embodiments of the present disclosure.

In some embodiments, network 104 may include any one or a combination of many different types of networks, such as cable networks, the Internet, wireless networks, cellular networks, and other private and/or public networks.

In some embodiments, server cloud 108 (or "cloud service") may be implemented using one or more servers or server farms that can communicate with user devices 104 via network 106. The various servers of cloud service 108 can provide users with access to data and/or functionality. For example, cloud service 108 can implement an item recommendation system 110 that performs a method according to one or more embodiments of the present disclosure. For example, the item recommendation system 110 may generate one or more recommendations for presentation to the user based at least in part on the input received from user device 104.

As depicted in FIG. 1, in one embodiment, the item recommendation system 110 may maintain a catalog of a plurality of items (e.g., LED TV 114, digital single lens reflex (DSLR) camera 116, top freezer refrigerator 118, laser printer 120, etc.). Each of these items may be represented in a hierarchical taxonomy, as illustrated further in reference to FIGS. 3 and 4. The item recommendation system 110 may assign each of these items to an item concept of a plurality of item concepts that are represented in non-hierarchical taxonomy. For example, the LED TV 114 may be assigned to a "Televisions" item concept. Additionally, a liquid-crystal-display (LCD) TV (not shown) may also be assigned to the Televisions item concept. Meanwhile, the DSLR camera 116 may be assigned to a "Digital Cameras" item concept. Note that even though, under a hierarchical taxonomy, a "Televisions" category and a "Digital Cameras" category may both fall within a broader "Televisions and Video" product assortment category (e.g., thus encompassing both LED TV 114 and DSLR camera 116), under the non-hierarchical item concept taxonomy, LED TV 114 and DSLR camera 116 are assigned to distinct item concepts. As discussed below in reference to subsequent embodiments, this non-hierarchical taxonomy of item concepts may enable the recommendation system 110 to provide more relevant recommendations to users 102.

Although FIG. 1 shows items in the context of a merchandise catalog, it should be understood that any suitable items may mapped to item concepts. In a non-limiting example, this may include digital images, words in a query, videos, etc. Furthermore, as described below, these item concepts may be used to generate an item concept relatedness score for use in recommending items (e.g., content such as merchandise, webpages, digital images, search results, etc.).

Figure 2:
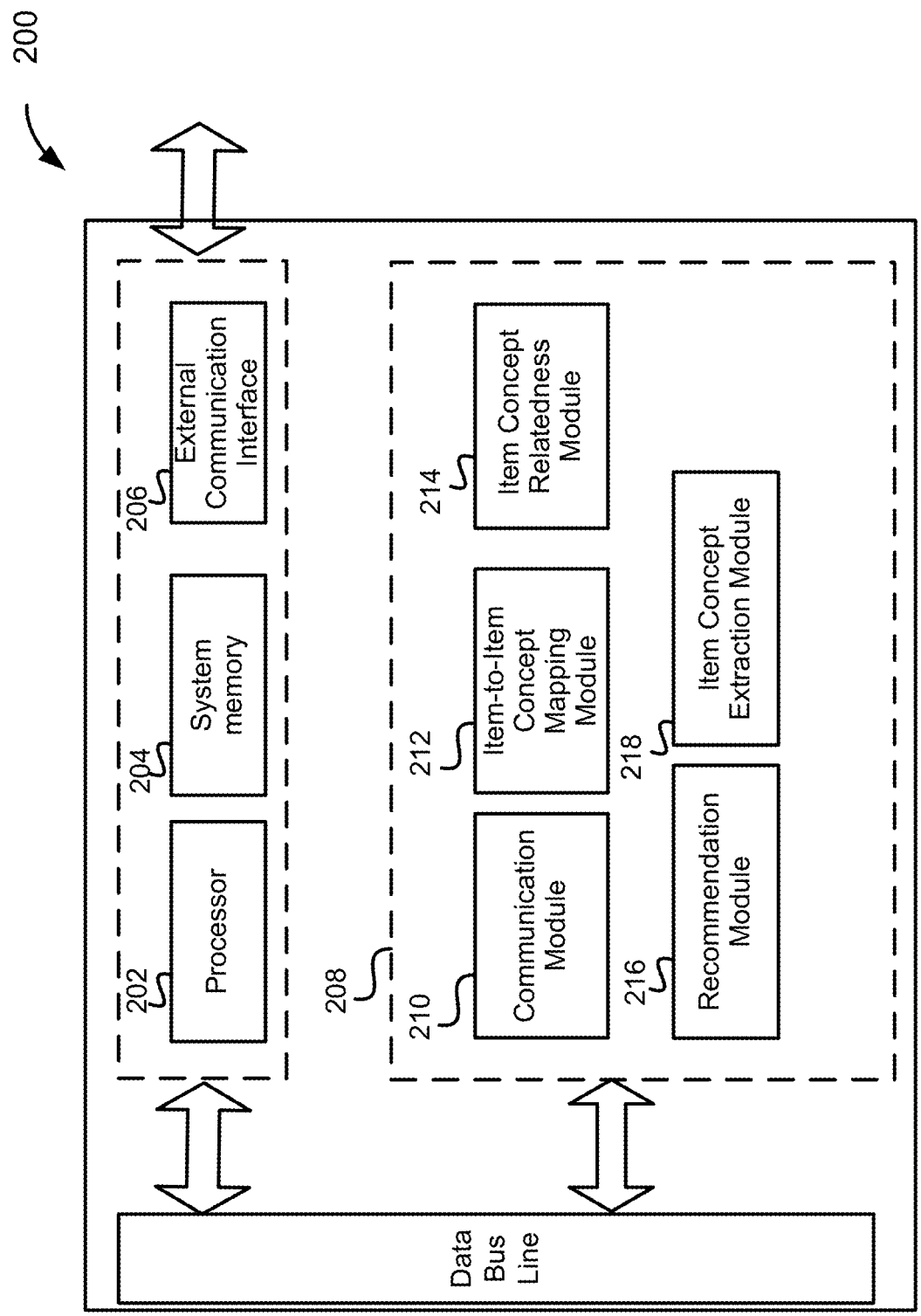
FIG. 2 illustrates an example architecture of a computer system to support providing recommendations to a user, in accordance with various embodiments.

FIG. 2 illustrates an example architecture of a computer system to support providing recommendations to a user, in accordance with various embodiments. In some embodiments, computer system 200 may be similar to item recommendation system 110 of FIG. 1. The device 200 may comprise a processor 202, which may be coupled to a system memory 204 and an external communication interface 206. A computer-readable medium 208 may also be operatively coupled to the processor 202.

The computer-readable medium 208 may store a number of software modules including a communication module 210, an item-to-item concept mapping module 212, an item concept relatedness module 214, a recommendation module 216, and an item concept extraction module 218.

The communication module 210 may comprise code that causes the processor 202 to generate messages, transmit messages, reformat messages, and/or otherwise communicate with other entities (e.g., user device 104). In some embodiments, this communication may be performed over network 106 of FIG. 1.

The item-to-item concept mapping module 212 may comprise code that causes the processor 202 to retrieve a mapping between an item and an item concept. In some embodiments, this mapping may be a bi-directional mapping. In some embodiments, the mapping may be such that each item of a plurality of items (e.g., in an item catalog) is assigned to one and only one item concept of a plurality of item concepts. The item-to-item concept mapping module 212 may receive an item (or item identifier) as input and then retrieve an assigned item concept (or item concept identifier). In some embodiments, an item identifier may correspond to a unique identifier (e.g., a sequence of alphanumeric characters, numerical digits, or any suitable representation) that identifies the item (and similar for an item concept identifier/item concept relationship). In some embodiments, the item identifiers may be received as input from an administrator (e.g., catalog administrator) of the system and stored by the system (e.g., in system memory 204). In some embodiments, the item identifier may correspond to an Amazon Standard Identification Number (ASIN). As discussed herein, an "item" and an "item identifier" (as well as an "item concept" and "item concept identifier") may be used interchangeably. The mapping between an item and an item concept may be stored using any suitable mechanism (e.g., a relational database). For example, using the illustration above, the module 212 may receive an item identifier corresponding to "LED TV" and may, in turn, retrieve an item concept identifier corresponding to the "Televisions" item concept. In some embodiments, following the input of the plurality of items into the system, the mapping of the plurality of items to the plurality of item concepts may be generated by the item concept extraction module 218, discussed further below.

The item concept relatedness module 214 may comprise code that causes the processor 202 to determine an item concept relatedness score between at least two item concepts. An item concept relatedness score may correspond to an indicator of a level of relatedness between at least two item concepts of the plurality of item concepts. In some embodiments, the score may be a real number between 0 and 1. In an example, a higher number may indicate a higher level of relatedness. In some embodiments, a level of relatedness between two item concepts may correspond to a probability that a user may relate an item assigned to one item concept with an item assigned to another item concept. For example, in a commerce context involving a user purchase, and using an illustration above, a "Shampoos" item concept may be highly related to a "Conditioners" item concept, but less related to a "Televisions" item concept. In this example, a user may be more likely to purchase an item assigned to the "Conditioners" item concept together with an item assigned to the "Shampoos" item concept than to purchase an item assigned to the "Televisions" item concept with an item assigned to the "Shampoos" item concept.

In some embodiments, an item concept relatedness score may be determined by computing a conditional probability between item concepts. For example, in a commerce context, the conditional probability may be calculated based at least in part on historical purchase data that involves co-selection (e.g., "co-acquisition" or "co-purchase") of items. A co-purchase may be a user purchase that involves two or more items (e.g., a shampoo item and a conditioner item) that were purchased together. In some embodiments, this historical purchase data may be compiled based on a population of users over time (e.g., two years or more). Based at least in part on this historical data, the system 200 may determine an item concept relatedness score for each item concept's relatedness to other item concepts.

In a more formalized example, consider item concepts $C_i$ and $C_j$ among the plurality of item concepts. The system 200 may compute the conditional probability $P_{ij}=P(C_j|C_i)$ by utilizing the co-purchases for all items that, respectively, roll up to item concepts $C_i$ and $C_j$, where i≠j. The system 200 may thus determine, for each item concept $C_a$ among the plurality of item concepts, an item concept relatedness score vis-a-vis item concept $C_i$ among the plurality of item concepts. In some embodiments, the list of item concept relatedness scores for each item concept $C_a$ (e.g., related to $C_i$) may be sorted (e.g., in descending order). Although, as discussed herein, an item concept relatedness score may be determined between only two item concepts (e.g., $P(C_j|C_i)$), embodiments of the present disclosure should not be construed to be so limiting. For example, an item concept relatedness score determined for item concept $C_j$ as it relates to item concepts $C_j$ and $C_i$ may be represented as $P(C_j, C_k|C_i)=P(C_j|C_i)*P(C_k|C_i)$, assuming conditional independence between concepts $C_j$ and $C_k$. Thus, a score pertaining to bundling two or more item concepts with another item concept (e.g., for generating bundles with multiple items) may be determined. In some embodiments, the conditional probabilities may be determined using a conventional Bayes' formula. In some embodiments, any suitable technique may be used to compute a conditional probability and/or item concept relatedness score to perform embodiments of the present disclosure. As a non-limiting example, see Linden, G., Smith, B., York, J. IEEE Internet Computing (2003) Amazon.com Recommendations, Item-to-Item Collaborative Filtering. In some embodiments, the scores between product concepts can be determined by the computer based on the past viewing/purchase history of users. For example, historical purchase records can determine that customers who bought an item classified as shampoo concept most likely also purchased items classified as hair conditioner concept.

It should be understood that an item concept relatedness score may be determined using any suitable method, which may vary between contexts. For example, in one embodiment, historical training data may be gathered that corresponds to what users have selected (e.g., clicked on) together within a given session. For example, the system 200 may receive input that a user clicked on a first DSLR camera and a second mirrorless camera within the same session. In this example, the first camera and the second camera may be assigned to different item concepts. The system 200 may use item selection data (e.g., instead of purchase data) to compute item concept relatedness scores. Thus, instead of using purchase bundle data, in this example the system may determine the scores based at least in part on whether the user selected to view the two items side-by-side (e.g., for a comparison of alternative/substitute items).

In yet another example, the system 200 may utilize both customer search data and customer purchase data to generate an item concept relatedness score. In this example, the system 200 may be trained to determine an item concept relatedness score for each item concept ($C_i$) among item concepts $C_1, C_2, \ldots, C_m$, given a set of input words ($w_1, w_2, \ldots W_n$) in an input query (q). In this case, the search query may be analogous to a selected item (discussed above), whereby each word ($w_i$) in the query is a sub-element of the selected item. The training data may consist of a variety of queries by users, each query paired with one or more items that were purchased (and/or selected) by the user for a given session. Each of the one or more purchased items may have been previously assigned to a particular item concept. In one embodiment, a machine learning model (e.g., a neural network) may be utilized to generate an item concept relatedness score for each item concept of the plurality of item concepts with respect to the search query. In one embodiment, the neural network may use a single-layer. The neural network may receive as training data multiple samples, each sample including the words in a query along with a ground truth label that corresponds to known item concept scores for the sample query (e.g., which may be determined based on the purchased items data). In some embodiments, prior to inputting the words from the query into the neural network, an embedding may be generated for the query. The embedding may correspond to a multidimensional data point that represents a context for each of the words (e.g., sub-elements) in the query. In some embodiments, a bag-of-words (BOW) model is used. For more information on this type of model, see, for example, Mikolov, T., Chen, K., Corrado, G., Dean, J. (2013) Efficient Estimation of Word Representations in Vector Space, arXiv: 1301.3781, which is herein incorporated by reference. Once the embedding is generated, the embedding may be input into the neural network to generate a predicted score for each item concept (C). The predicted item concept relatedness scores may be compared against the ground truth item concept scores for the particular query to train the neural network. In some embodiments, the neural network may be trained based at least in part on minimizing a loss function (e.g., mean-squared error (MSE)). The loss function may be configured to determine a difference between the ground truth item concept(s) the predicted item concept(s). Once trained, the neural network may then be able to output, for a given query (q), an item concept relatedness score ($P_i$) for each item concept ($C_i$) of the plurality of item concepts. It should be understood that any suitable machine learning model may be suitable to generate the item concept relatedness score, including, but not limited to, supervised or unsupervised machine learning, natural language processing, machine perception, computer vision, affective computing, statistical learning and classification (including use of hidden Markov models, Bayesian network models and Kalman filters), reinforcement learning including neural networks, search algorithms and optimization algorithms (including evolutionary computing) and automated reasoning.

The recommendation module 216 comprises code that causes the processor 202 to determine whether to recommend that an item should be provided for presentation to a user. The recommendation module 216 may utilize an item concept relatedness score (e.g., determined by the item concept relatedness module 214) to determine a recommendation. In one embodiment, the recommendation module 216 is configured to determine whether a previously purchased item (e.g., a merchandise item) should be recommended to be bundled together with another item previously purchased by a user. For example, the system 200 may receive a list of items that were previously purchased by a user (e.g., user 102). For each item in the list, the recommendation module 216 may determine an item concept relatedness score (e.g., invoking the item concept relatedness module 214). Note that item concepts for the items in the list of previously purchased items may be retrieved by invoking the item-to-item concept mapping module 212.

In some embodiments, the recommendation module 216 further determines, for each item (a) in the list of previously purchased items $(a_1, a_2, \ldots a_N)$, a respective probability $(p_1, p_2, \ldots p_N)$, that the user 102 may re-purchase the item. The system may utilize any suitable method to determine a probability of re-purchasing an item. For more information, and as a non-limiting example, see Bhagat, Rahul & Muralidharan, Srevatsan & Lobzhanidze, Alex & Vishwanath, Shankar. (2018). Buy It Again: Modeling Repeat Purchase Recommendations. 62-70. 10.1145/3219819.3219891, which is herein incorporated by reference. The recommendation module 216 may then iterate over previously purchased items in the list to determine whether to recommend that one or more items be bundled together. In a simplified example, the module 216 may perform the iteration as:

for item$_i$ in Previously Purchased List:
   for item$_j$ in Previously Purchased List (i j):
      determine $P_{ij}=P(C_j|C_i)$
      determine bundle score $b_i$ for items $a_i$ & $a_j=p_i*p_1*P_{i,i}$
   rank bundles (b) according to bundle scores in descending order select top ranked N bundles for recommendation to user It should be understood that, although the example above involves recommendations for bundling two items together for purchase, it should be understood that bundles involving multiple items (e.g., $a^i$, $a^j$, and $a^k$) may also be recommended, for example by multiplying multiple scores together for items (e.g., $p_i*p_1*p_k*P(C_j, C_k|C_i)$. While this example illustrates a specific algorithm for recommending a bundle of items, it should be understood that other algorithms may be used, depending on the context (e.g., for recommending substitute items).

In another embodiment, the module 216 may recommend a bundle of items for purchase based at least in part on receiving input corresponding to a selection (e.g., but not yet purchased) of an item. For example, the selection may correspond to selecting an item to add to the shopping cart. The module 216 may then determine the assigned item concept for the selected item. The module 216 may then compute an item concept relatedness score between the selected item concept and other item concepts (e.g., from items in a list of previously purchased items, previously selected items, previously searched items, etc.). Then, based on this score, the module 216 may determine whether to recommend to bundle one or more other item concepts (e.g., an item from the item concept) with the selected item concept (e.g., selected item). In some embodiments, for example when recommending items to bundle together in a purchase, the recommendation module 216 may determine that a user is unlikely to want to purchase an item assigned to the same item concept as another recently purchased item. For example, consider a scenario in which the user selects a video cable to add to the shopping cart. In this example, the video cable may be assigned to an item concept (e.g., "Video Cables") that is highly conceptually related to a "Televisions" item concept (e.g., based on previous co-purchases by the user and/or other users), and thus, might otherwise be recommended to bundle together for purchase. However, if the user recently purchased a television assigned to the Televisions item concept, it may be unlikely that the user would want to purchase another television assigned to the Televisions item concept shortly after the previous television purchase. Accordingly, based at least in part on determining that a television assigned to the Televisions item concept was recently purchased (e.g., within a predetermine period of time such as 3, 6 or 12 months), the recommendation module 216 may determine to not recommend items from the Televisions item concept for bundling for this purchase. Instead, for example, the module 216 may recommend another item from a different (but related) item concept (e.g., an audio cable assigned to an "Audio Cables" item concept). The probability may be based on previous co-purchases by the user and/or other users. Alternatively, or in addition, the probability may be explicitly lowered by the system, for example, using a damping factor.

As discussed above, the recommendation module 216 may utilize the item concept relatedness score for many different applications beyond bundling complementary items. For example, the score may be used to determine whether to present alternative (e.g., substitute) items to a user, for example, in a side-by-side comparison. For example, the module 216 may present higher or lower-priced alternatives that may still be within the same item concept (or highly related item concept) for comparison to the user. This application of the present disclosure may be used to improve upon conventional methods of presenting items to a user for comparison. For example, a user may want to compare items with the same (or similar) item concept (e.g., Televisions, Video Projectors) instead of being presented with other items from other item concepts for comparison (e.g., video cables, video players), which, although they may be hierarchically grouped under the same product assortment, belong within separate discrete item concepts. Thus, in this example, the system may present one or more televisions (each assigned to the same item concept) for side-by-side comparison by the user. Also, as mentioned above, in some embodiments, items from item concepts that are highly conceptually related to another item concept (e.g., Video Projectors, which may be a different item concept from Televisions, but still a potential substitute) may also be displayed for comparison by the user. Thus, the system may present a video projector (e.g., assigned to a Video Projectors item concept) for comparison with other items assigned to the Televisions item concept. Note that these examples that involve item comparison (or substitute) scenarios may be different than an earlier example describing bundling of complementary items, where the system may determine not to recommend an item assigned to the same (or similar) item concept as a recently purchased item. Similar to as described earlier, in reference to generating an item concept relatedness score, the system may use any suitable method to determine whether to recommend (or not recommend an item), which may vary between contexts (e.g., scenarios involving recommending complementary items versus recommending substitute items).

Figure 3:
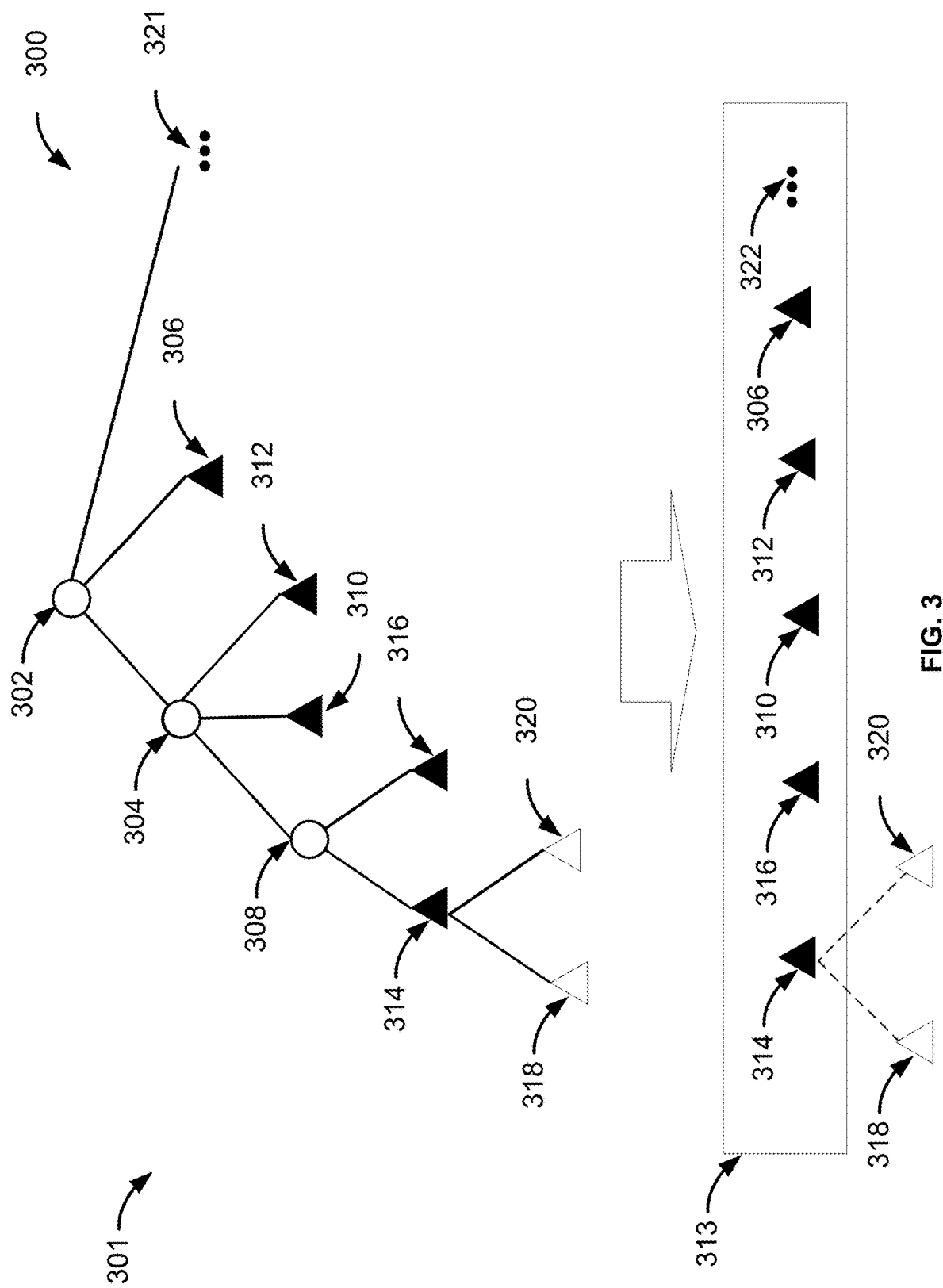
FIG. 3 illustrates an example data transformation flow performed by a computer system in order to provide a recommendation, in accordance with various embodiments.
Figure 4:
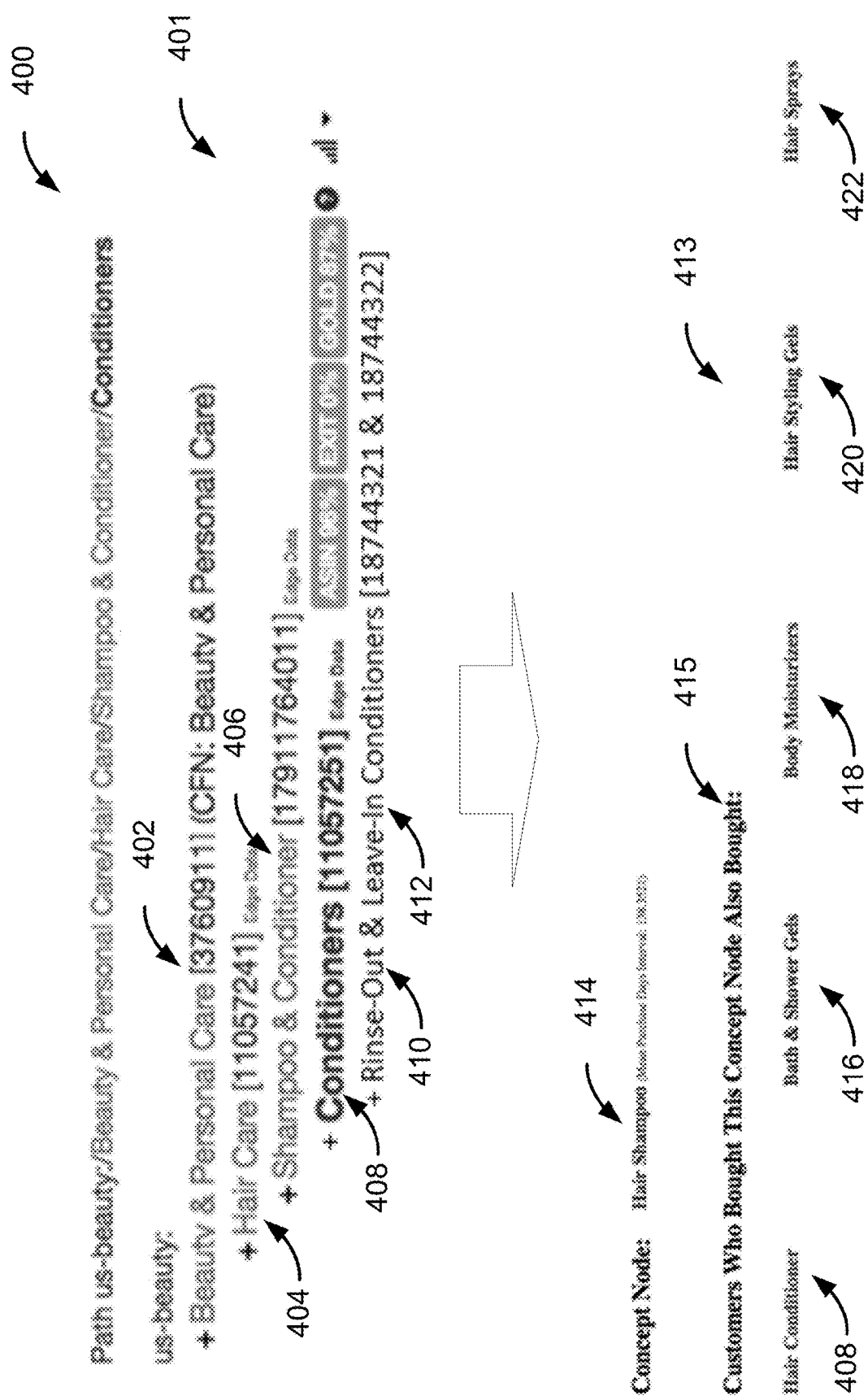
FIG. 4 illustrates an example data transformation flow performed by a computer system to provide a recommendation, in accordance with various embodiments.

The item concept extraction module 218 comprises code that causes the processor 202 to extract item concepts from a hierarchical taxonomy of items (and/or item categories) to form a non-hierarchical taxonomy of item concepts. As discussed above, an item concept may correspond to a level of abstraction for an item that is neither too generic (e.g., assortments of product types) nor too product specific (e.g., a product type with specific attributes). For illustrating the process of extracting a non-hierarchical list of item concepts in accordance with one embodiment of the disclosed technology, consider FIGS. 3 and 4. FIG. 3 illustrates a conceptual workflow for extracting item concepts from a hierarchical taxonomy of item categories, while FIG. 4 provides an illustration of implementing the flow of FIG. 3 within an e-commerce context.

FIG. 3 illustrates a data transformation flow performed by a computer system in order to provide a recommendation based on item concepts, in accordance with various embodiments. In FIG. 3, workflow 300 illustrates a process of transforming a hierarchical taxonomy 301 of item category nodes into a non-hierarchical taxonomy 313 of item concept nodes. In some embodiments, hierarchical taxonomy 301 represents a tree of nodes. Each node may correspond to a category, whereby a given category may contain other categories as branches. Some nodes 302, 304, 308 (represented as circle nodes) may correspond to product assortments that are collections of different types of items (e.g., entertainment devices, home furnishings etc.). Other nodes 306, 310, 312, 314, 316, 318, 320 (represented as triangle nodes), respectively, may correspond to product categories that represent items of the same type (e.g., a product category), but whereby there may be different sub-types that are distinguished by having different attributes for each sub-type (e.g. televisions, LCD televisions, OLED televisions etc.). Thus, while a triangle node (e.g., 314) may have children triangle nodes 318 and 320, these children triangle nodes may respectively represent items that have different attributes per node, but still conceptually roll up to the same product category. In one embodiment, nodes representing product assortments are not item concept nodes. In addition, an item concept node will not have child nodes assigned to a different item concept. Thus, triangle nodes 306, 310, 312, 314, and 316 may correspond to different item concept nodes, while triangle nodes 318, 320 are assigned to the same item concept as their parent node 314. For example, node 314 may be classified as a television item concept node while nodes 318 and 320 representing LED televisions and OLED televisions are assigned to the same item concept as their parent node and are not themselves item concept nodes. In some embodiments, product assortment nodes may have product category nodes as child nodes, but product category nodes may not have product assortment nodes as child nodes. In some embodiments, product category nodes may have product category nodes as child nodes, forming a 'tree' of product category nodes with a single product category node as the 'root' of the tree. In some embodiments, only (i) product category nodes without child nodes or (ii) the root of a tree of product category nodes are selected as item concept nodes. In some embodiments, the set of selected item concept nodes are thereby non-hierarchical and each item associated with an item concept node is associated with one and only one item concept node. In some embodiments, the set of such item concept nodes thereby partitions (in the set theoretic sense) the item concept space of all item concepts. In some embodiments, the hierarchical taxonomy 301 may be represented using any suitable data structure (e.g., a hierarchical tree structure, a relational database, etc.).

In some embodiments, the item concept extraction module 218 may proceed by receiving the hierarchical taxonomy 301 as input (e.g., from a system administrator). In some embodiments, the nodes of the taxonomy may have been previously coded to include an item concept for some of the nodes as described above. The item concept extraction module 218 may extract item concept nodes from the hierarchical taxonomy 301 into item concept list 313. In some embodiments, the extraction may proceed by partitioning a plurality of items from an item catalog such that each item of the plurality of items is assigned to one and only one item concept of the plurality of item concepts. For example, each of the nodes within hierarchical taxonomy 301 may include one or more attributes. As a non-limiting example, the nodes of hierarchical taxonomy 301 may respectively correspond to "browse nodes" that are defined by the Amazon Product Advertising API. In this example, each of the browse nodes may have one or more properties (e.g., attributes) that are associated with one or more items of the item catalog. Based at least in part on the attributes of each browse node, the item concept extraction module 218 may determine which nodes should be classified as item concept nodes, and thus, which items should be assigned to a specific item concept.

Within an e-commerce context using browse nodes (referenced above), in some embodiments, each of the browse nodes may have an attribute that defines whether the node is a "Product Assortment" node (e.g., representing an assortment of different product categories) or a "Product Category" node (e.g., representing a particular product category and/or product category sub-type). Using the illustration of FIG. 3, as described above, the circle nodes 302, 304 and 308 may correspond to Product Assortment nodes, while the triangle nodes 306, 310, 312, 316, 318, and 320 may correspond to Product Category nodes. In some embodiments, an item concept node may be defined as a Product Category node which does not have another Product Category node as a parent (e.g., or, alternatively, a Product Category node that has a Product Assortment node as a parent). For example, the item concept extraction module 218 may determine that node 318 and node 320 belong to the same item concept (e.g., represented by node 314), based at least in part on properties of each node. In this example, as mentioned above, node 318 and node 320 correspond to Product Category nodes which do have a Product Category node (e.g., node 314) as a parent, and therefore are not item concept nodes. The module 218 may further determine that node 308 corresponds to a Product Assortment node of multiple product categories, and thus corresponds to a different level of abstraction than an item concept node. Thus, the item concept extraction module 218 may determine that node 314 represents the appropriate level of item abstraction as an item concept, and may be included within a list 313 of item concepts. (As depicted in FIG. 3, the list 313 of item concept nodes is differentiated by being solid color triangles within the bounding box.) Meanwhile, node 318 and node 320 (linked by a dotted line to item concept node 314), are Product Category nodes that are assigned to the item concept node 314, but are not themselves concept nodes. Also, by extension, the items grouped under each of node 318 and node 320 may be classified as being assigned to the item concept 314. Similarly the module 218 may classify nodes 306, 310, 312, and 316 as item concepts for inclusion within list 313. It should be understood that any suitable number of nodes 321 may be included within model 301, and any suitable number of item concepts 322 may be included within the list of item concepts 313.

FIG. 4 illustrates an example data transformation flow performed by a recommendation computer system, in accordance with various embodiments. As discussed above, flow 400 provides an illustration of implementing the flow 300 of FIG. 3 within an e-commerce context. It should be understood that the flow 300 may be implemented and applied to any suitable context (e.g., search results), as discussed above. In flow 400, hierarchical taxonomy 401 may include multiple nodes, depicted as a collapsed tree model. For example, "Beauty & Personal Care" node 402 may correspond to node 302 of FIG. 3. "Hair Care" node 404 may correspond to node 304. "Shampoo & Conditioner" node 406 may correspond to node 308. "Conditioners" node 408 may correspond to node 314. Meanwhile, "Rinse-Out Conditioners" 410 and "Leave-In Conditioners" 412 may respectively correspond to node 318 and node 320. As described earlier, nodes 402, 404, and 406 may correspond to nodes that encompass more than one conceptual item type (e.g., Product Assortment nodes). In contrast, nodes 410 and 412 may correspond to Product Category nodes that are sub-types of the same conceptual Product Category (e.g., "Conditioners" product category, node 408).

Continuing with flow 400 as an example, the item concept extraction module 218 of FIG. 2 may receive the hierarchical taxonomy 401 as input. Then, based on this input, the module 218 may extract item concept nodes into list 413 similar to as described in reference to FIG. 3. For example, "Conditioners" node 408 may extracted as an item concept. Additionally, "Hair Shampoo" 414, which may originally be a node (not shown) under "Shampoo & Conditioner" node 406, may be extracted as a separate item concept. "Bath & Shower Gels" node 416 may be an item concept that corresponds to node 306, "Body Moisturizers" node 418 may be an item concept that corresponds to one of the nodes 301, "Hair Styling Gels" node 420 may be an item concept that corresponds to node 310 (nested (not shown) under the "Hair Care" node 404), and "Hair Sprays" node 422 may be an item concept that corresponds to node 312 (also nested (not shown) under the "Hair Care" node 404). As depicted in FIG. 4, a simplified GUI 415 may display which item concept nodes are conceptually related to each other (e.g., determined by item concept relatedness module 214). For example, nodes 408, 416, 418, 420, and 422 may be conceptually related to node 414. Also note that each of these item concept nodes may originally be positioned at different levels of the hierarchical taxonomy 401, which is now organized as a non-hierarchical taxonomy 413. Thus, while conventional methods may determine relatedness on a per-item level, embodiments of the present disclosure combine the process of extracting of item concepts with the process of determining an item concept relatedness score between item concepts. In at least this way, embodiments of the present disclosure may improve upon conventional methods for providing recommendations to users (e.g., determining complementary items, substitute items, improved search results, etc.) by performing relatedness comparisons at a level of abstraction that enables filtering out less relevant items and/or including more relevant items in recommendations than conventional methods.

Figure 5:
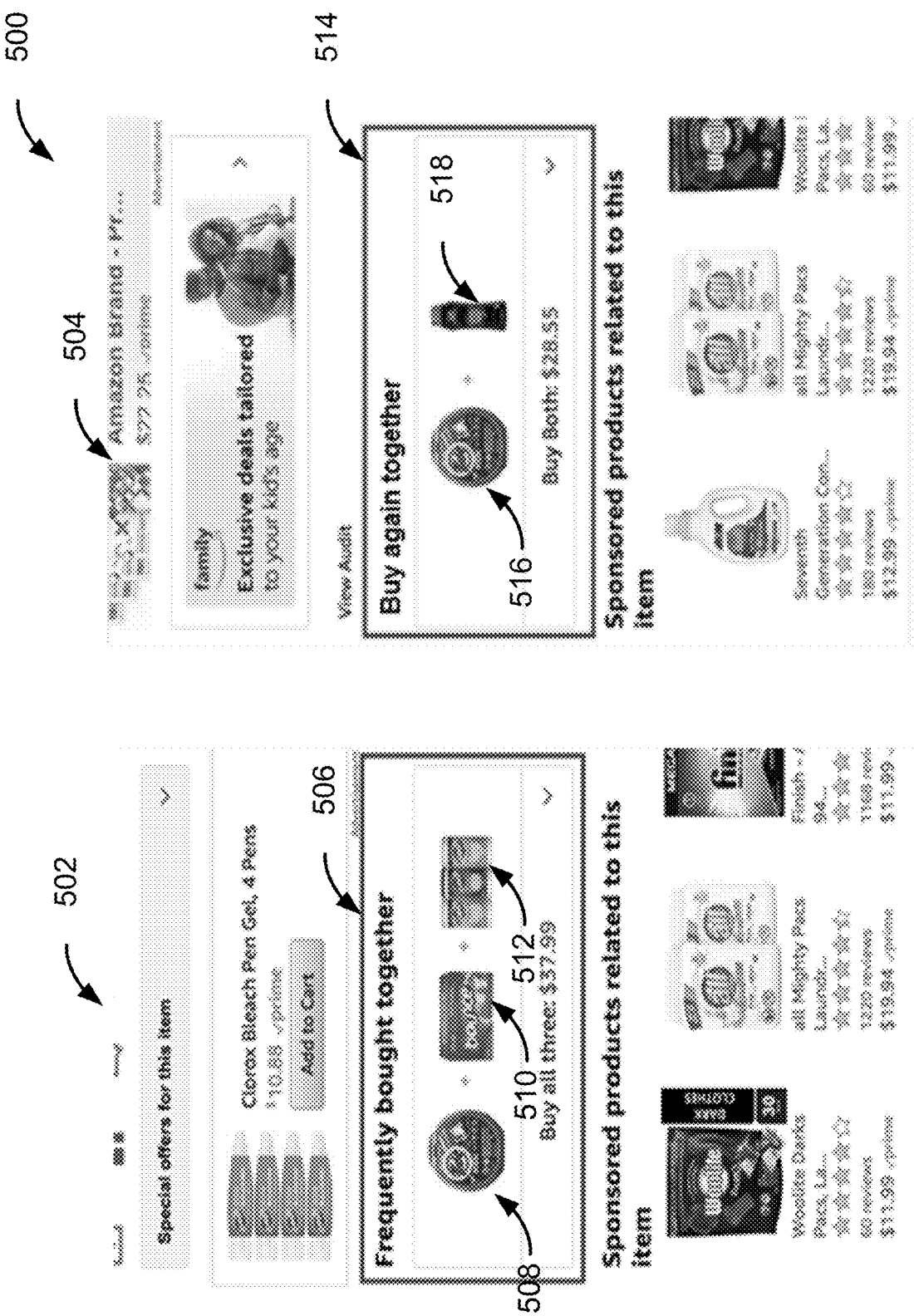
FIG. 5 illustrates an example user interface for providing recommendations to a user, in accordance with various embodiments.

FIG. 5 illustrates an example user interface for providing recommendations to a user, in accordance with various embodiments. In simplified GUI comparison 500, a comparison is depicted between a GUI interface 502 of a conventional recommendation system and a GUI interface 504 of a recommendation system according to an embodiment of the present disclosure (e.g., a related concepts recommendation system 200 of FIG. 2). In both GUI interfaces 502 and 504, an e-commerce context is depicted in which a user 102 may shop for one or more items. In the traditional GUI interface 502, a conventional system may recommend other items 506 that are "Frequently Bought Together." In this example, as described above, the recommended items 508, 510, and 512 may be items that are not personalized to the user. For example, these items may be selected because other users within a user population have bought these items together.

In contrast, GUI interface 504 may provide personalized recommendations for items 516 and 518 based at least in part whether the items are conceptually related to the items in the user's shopping cart. In GUI interface 504, items 516 and 518 may represent items previously purchased by the user. In this example, the system 200 may improve upon conventional systems at least by filtering out (and/or including) items based on their conceptual relatedness and not simply whether users have purchased them together. For example, suppose the user has added a bleach product to their shopping cart (not shown). The system may determine that a laundry detergent 516 is conceptually related to the bleach (e.g., via the item concept relatedness score), was previously purchased by the user, and has a strong likelihood of being purchased again at some point by the user. Accordingly, the system may recommend bundling laundry detergent 516 with the bleach. In another example, under a hierarchical taxonomy, bleach and paint thinner products may both fall under the same Product Category but have different concepts (clothes cleaning versus paint brush cleaning (e.g., which have a low item concept relatedness score), and thus, not recommend the paint thinner for bundling. It should be understood that, although in some embodiments, the system may provide personalized recommendations by selecting from among items that were previously purchased by the user which are conceptually related (e.g., to the item(s) in the user's shopping cart), embodiments of the present disclosure should not be construed to be so limiting. For example, the system may recommend other items that are conceptually related (e.g., based on the item concept relatedness score) that were not previously purchased or selected by the user.

In yet another example, item 518 may be a new hybrid bleach detergent that was recently released on the market. As described earlier, under conventional recommendation systems, item 518 may not be recommended to the user because there is not enough purchase history data of the particular item 518 from other users to determine a sufficient correlation (e.g., without introducing unacceptable noise). For example, in some embodiments, the system may not correlate an item with another item (e.g., to be bundled together) unless they appear together in at least a predetermined number (e.g., matching a threshold value) of co-purchases by users of the user population. However, by determining relatedness on an item concept level (instead of a per-item level), embodiments of the present disclosure may nevertheless include item 518 as a bundling recommendation if is determined to be strongly conceptually related. It should be understood that embodiments of the present disclosure improve upon conventional techniques where there typically may not be a sufficient amount of data obtained from a population of users to recommend an item. For example, in addition to the above example involving recommending items that may not have much purchase history data within the user population, the system may also use item concepts to recommend search results that may be infrequently searched, and thus, typically may not be returned to the user. For example, in a case where a search query is highly conceptually related to one or more item concepts, the system may return search results matching those one or more item concepts, even though the individual results may not otherwise be correlated with the search query. It should also be understood that other factors (in addition to item concept relatedness) may be used in embodiments to determine a recommendation. For example, the system 200 may also factor in a likelihood of the user repurchasing/reacquiring the product, as described above.

Figure 6:
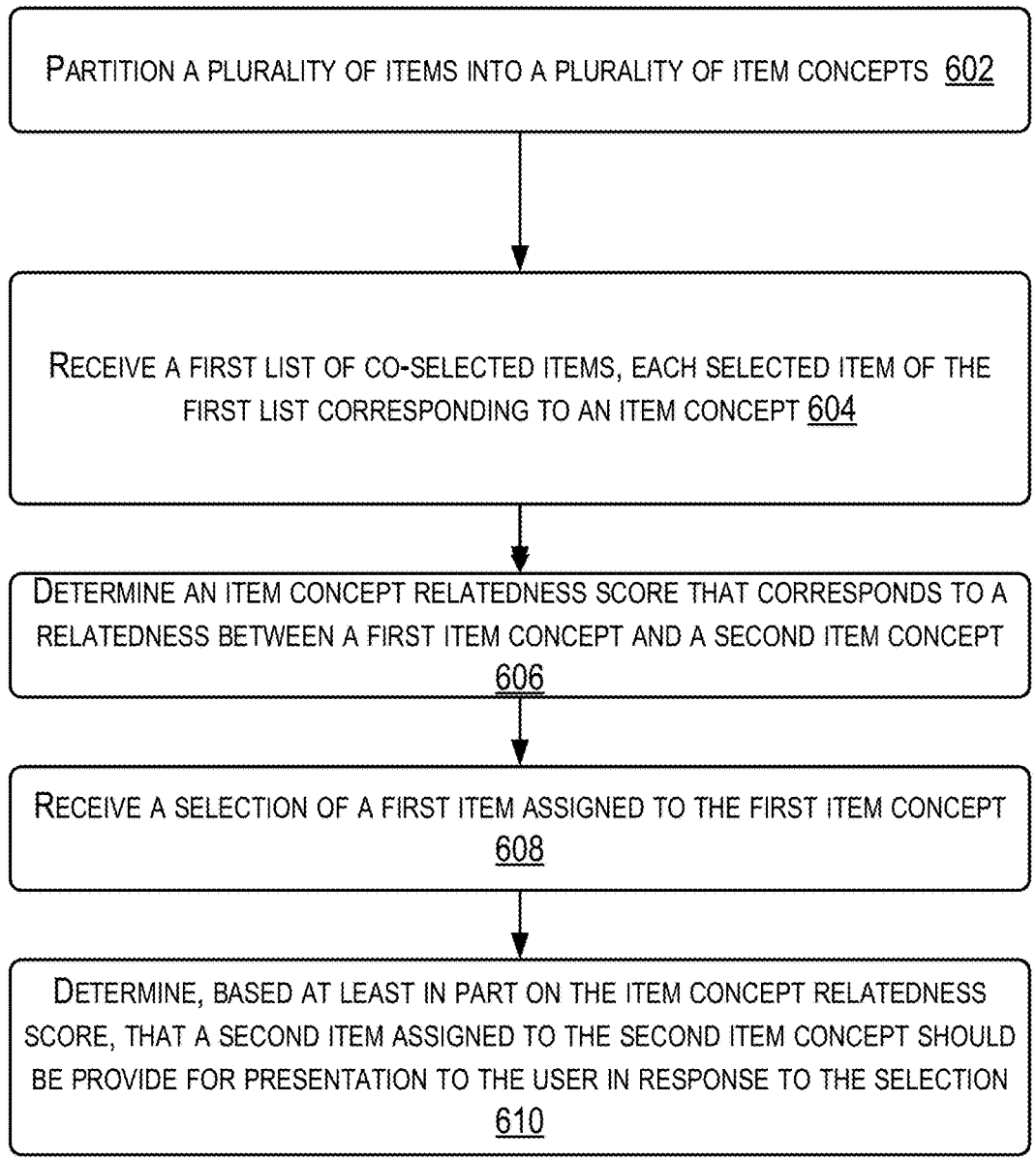
FIG. 6 illustrates an example flow for providing recommendations to a user, in accordance with various embodiments.

FIG. 6 illustrates an example flow for providing recommendations to a user, in accordance with various embodiments. In particular, flow 600 of FIG. 6 describes a system determining that an item should be provided for presentation to a user based at least in part on an item concept relatedness score. In some embodiments, the system of FIG. 6 may correspond to system 200 of FIG. 2. Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At step 602, the system may partition a plurality of items into a plurality of item concepts. In some embodiments, the plurality of items may be partitioned such that each item of the plurality of items is assigned to one and only one item concept of the plurality of item concepts. In some embodiments, an item may correspond to a physical object (e.g., merchandise), or a non-physical object (e.g., a query of words, a digital image or video, etc.). In some embodiments, the partitioning may be performed similar to as described in reference to FIGS. 2 and 3 (e.g., performed by the item concept extraction module 218).

At step 604, the system may receive a first list of co-selected items. In some embodiments, each selected item of the first list may correspond to an item concept. In some embodiments, the first list of co-selected items may correspond to historical data of user purchases (e.g., co-acquisitions or co-purchases) across a population of users. For example, each of the user purchases may involve two or more items (e.g., a shampoo item and a conditioner item) that were purchased together. In some embodiments, this historical purchase data may be compiled based on a population of users over time (e.g., two years or more). In other embodiments, the co-selected items may be based on other types of data. For example, it may include a list of previous search queries, whereby each search query contains one or more words, and may be analogous to a selected item. Each query may be associated with one or more items (e.g., that were purchased during the same user session as the query), thus forming a co-selected item(s). In another embodiments, a co-selected item may correspond to two or more items that were selected to be viewed side-by-side for comparison. Any suitable list of co-selected items may be suitable to perform embodiments of the present disclosure, whereby each selected item of the first list may correspond to (e.g., be assigned to) an item concept that was determined at step 602. In some embodiments, these item-to-item concept assignments may be retrieved via the item-to-item concept mapping module 212 of FIG. 2.

At step 606, the system may determine an item concept relatedness score that corresponds to a relatedness between a first item concept and a second item concept. In some embodiments, the system may determine the item concept relatedness score based at least in part on the first list of step 604. For example, the system may invoke the item concept relatedness module 214 to determine the item concept relatedness score. As discussed in reference to FIG. 2, the score may be determined for a variety of different contexts (e.g., search queries, bundling of complementary items, comparison of substitute items, etc.). The item concept related score may also be computed for multiple item concepts together, including for any number of permutations and combinations of item concepts (e.g., an inventory of scores for each item concept vis-a-vis the other item concepts).

At step 608, the system may receive a selection of a first item assigned to the first item concept of the plurality of item concepts. In some embodiments, the selection of the first item may be received from the user 102 (e.g., as depicted in reference to FIG. 1), and may correspond to a search query, an addition of an item to a shopping cart, a click of an item, or any suitable selection mechanism. In some embodiments, the selection may be auto-generated (e.g., auto-determined) by the system. For example, the system may determine a cadence by which a user purchases a particular disposable item (e.g., toothpaste) over time. Based at least in part on this cadence, the system may select this item to recommend for purchasing the toothpaste again to refill the user's stock.

At step 610, the system may determine, based at least in part on the item concept relatedness score, that a second item assigned to the second item concept should be provided for presentation to the user in response to the selection. In some embodiments, this step may be performed by the recommendation module 216 of FIG. 2. In some embodiments, the system may determine whether to provide the second item for presentation to the user based at least in part on whether the item concept relatedness score matches (e.g., equals or exceeds) a certain threshold value. If the score does not match the threshold value, then the item may be excluded from presentation (e.g. filtering out less relevant items). In some embodiments, presenting the item to the user may take any suitable form, including, but not limited to, displaying an image of the item, adding the item to a shopping cart, displaying the item as part of a potential bundle, displaying search results, etc.

Figure 7:
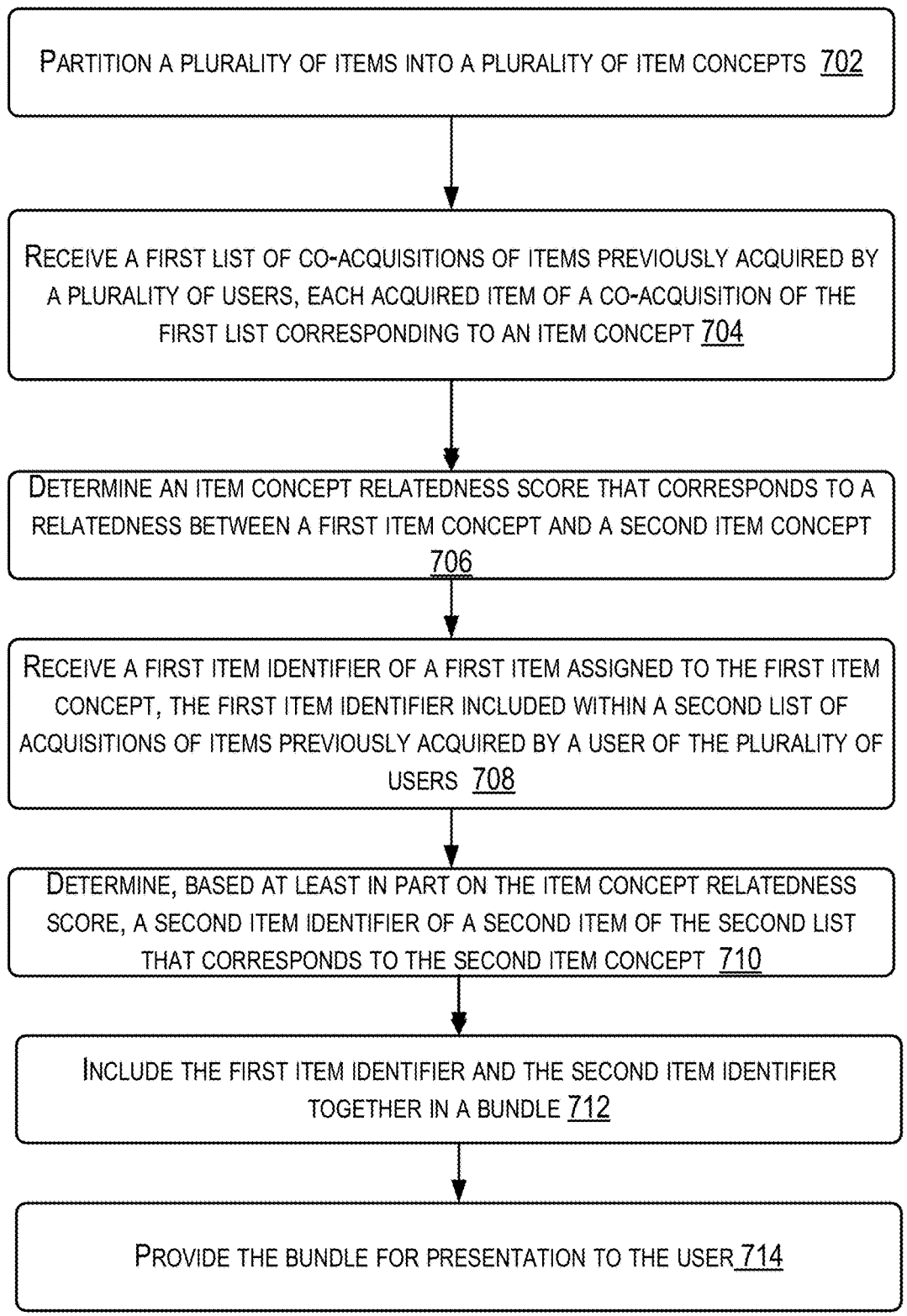
FIG. 7 illustrates another example flow for providing recommendations to a user, in accordance with various embodiments.

FIG. 7 illustrates another example flow for providing recommendations to a user, in accordance with various embodiments. In particular, flow 700 of FIG. 7 describes a particular embodiment in which a system utilizes an item concept relatedness score to determine whether to recommend a complementary item be included in a bundle (e.g., for visualization, purchasing, etc.). In some embodiments, the system of FIG. 7 may correspond to system 200 of FIG. 2.

At step 702, the system may partition a plurality of items into a plurality of item concepts. In some embodiments, this step may be similar to step 602 of FIG. 6.

At step 704, the system may receive a first list of co-acquisitions of item previously acquired by a plurality of users. In some embodiments, each acquired item of a co-acquisition of the first list may correspond to an item concept. In some embodiments, a co-acquisition may correspond to a purchase and/or selection of two or more items together.

At step 706, the system may determine an item concept relatedness score that corresponds to a relatedness between a first item concept and a second item concept. In some embodiments, this step may be similar to step 606 of FIG. 6.

At step 708, the system may receive a first item identifier of a first item assigned to the first item concept, the first item identifier included within a second list of acquisitions of items previously acquired by a user of the plurality of users. In some embodiments, the first item identifier may be similar to as described with reference to the item-to-item concept mapping module 212 of FIG. 2. For example, the first item identifier and the first item concept may respectively correspond to unique identifiers. In one embodiment, the second list of acquisitions of items may correspond to a plurality of items previously purchased (e.g., or otherwise selected) by a user of the plurality of users.

At step 710, the system may determine, based at least in part on the item concept relatedness score, a second item identifier of a second item of the second list, whereby the second item corresponds to the second item concept. In some embodiments, the system may perform this step by determining a list of item concept relatedness scores for each assigned item concept of items of the second list as related to the first item concept. In some embodiments, the system may also maintain a reacquisition likelihood score (e.g., a probability that the user will require the first item). In some embodiments, the system may determine a bundle score for including the first item and the second item together in a bundle. For example, the bundle score may be determined based at least in part on multiplying: (1) the reacquisition likelihood score of the first item, (2) the reacquisition likelihood score of the second item, and/or (3) the item concept relatedness score. In some embodiments, this may be performed by the recommendation module 216 of FIG. 2. In some embodiments, multiple bundle scores may be generated for different combinations of items from the second list. In some embodiments, a candidate bundle may include any number of suitable items.

At step 712, the system may include the first item identifier and the second item identifier together in a bundle. In some embodiments, this step may be performed by first ranking bundle scores among a list of other bundle scores that were generated at step 710. The first identifier and the second identifier may be selected as the bundle that has the highest ranking score, or any suitable selection mechanism.

At step 714, the system may provide the bundle for presentation to the user. In some embodiments, this step may be similar to step 610 of FIG. 6, and/or as depicted in reference to FIG. 5.

Figure 8:
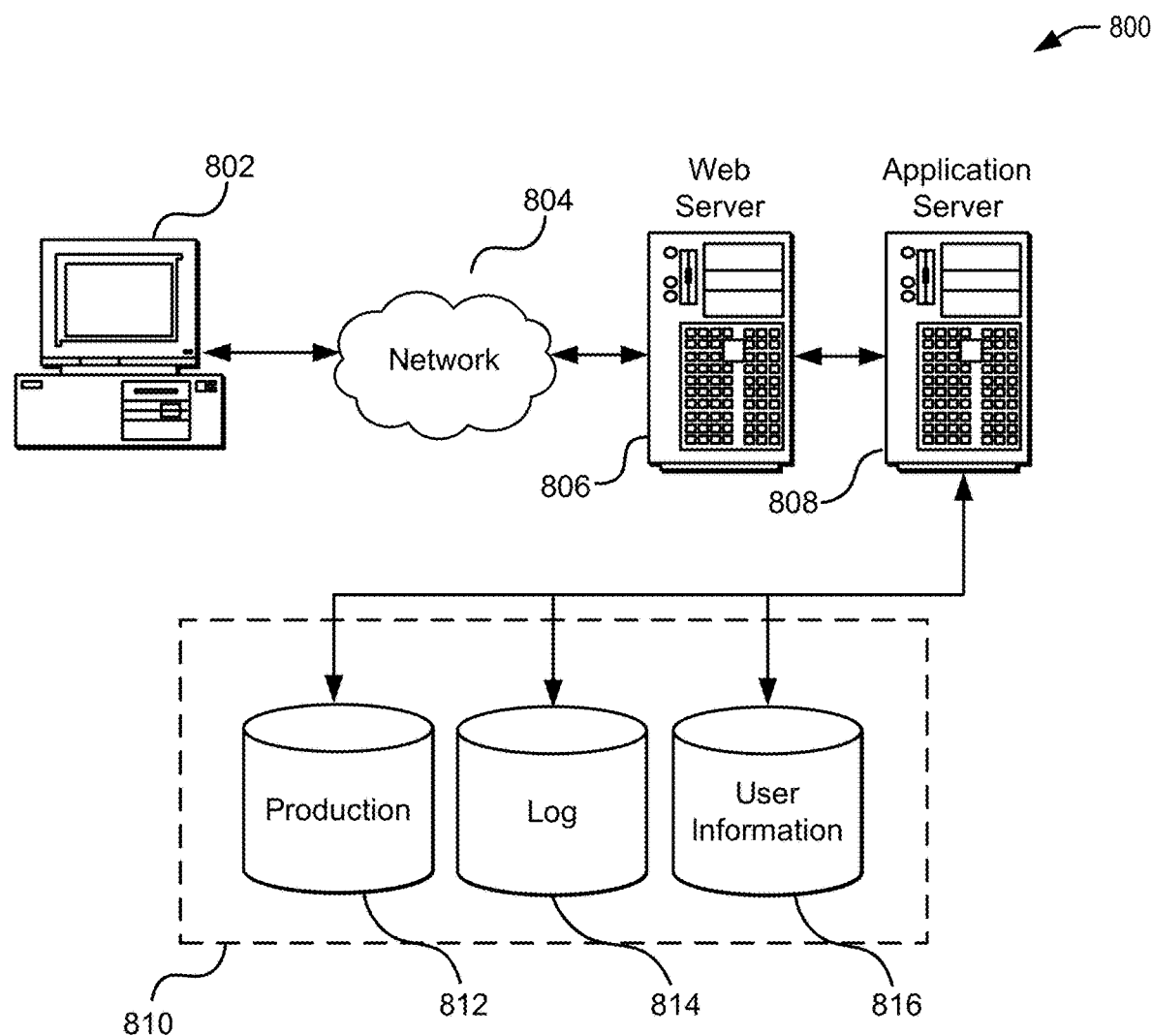
FIG. 8 illustrates an example environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    partitioning, by a computer system, a plurality of items in an item catalog into a plurality of item concepts such that each item of the plurality of items is assigned to one and only one item concept of the plurality of item concepts, the plurality of item concepts partitioned according to a non-hierarchical taxonomy;
    receiving, by the computer system, a first list of co-acquisitions of items previously acquired by a plurality of users, each acquired item of a co-acquisition of the first list corresponding to an item concept of the plurality of item concepts;
    determining, by the computer system based at least in part on the first list, an item concept relatedness score that corresponds to a relatedness between a first item concept of the plurality of item concepts and a second item concept of the plurality of item concepts;
    receiving, by the computer system, a first item identifier of a first item assigned to the first item concept, the first item identifier included within a second list of acquisitions of items previously acquired by a user of the plurality of users;
    determining, by the computer system based at least in part on the item concept relatedness score, a second item identifier of a second item of the second list that corresponds to the second item concept of the plurality of item concepts, the item concept relatedness score associated with a likelihood of the second item being acquired by the user when the first item identifier and the second item identifier are presented in association with one another via a user interface of a user device of the user;
    including, by the computer system, the first item identifier and the second item identifier together in a bundle based at least in part on the likelihood;
    providing, by the computer system, the bundle for presentation of the first item identifier in association with the second item identifier via the user interface of the user device to the user such that there is a reduction of memory and/or processor utilization for at least one of the user device or the computer system;
    receiving, by the computer system, a selection of the bundle via the user interface of the user device; and
    determining, by the computer system, an instruction to combine both the first item and the second item into a same package for shipment to the user.

2. The computer-implemented method of claim 1, wherein the plurality of item concepts corresponds to a non-hierarchical list of item concepts.

3. The computer-implemented method of claim 1, wherein determining the item concept relatedness score further comprises:
    determining, by the computer system, a probability of a second selection of the second item concept, given a first selection of the first item concept, wherein a selection of an item concept corresponds to acquiring an item that is assigned to the item concept.

4. The computer-implemented method of claim 1, the method further comprising:
   maintaining, by the computer system, a reacquisition likelihood score for the first item;
   determining, by the computer system, a bundle score based at least in part on multiplying the reacquisition likelihood score for the first item and the item concept relatedness score;
   ranking the bundle score among a list of other bundle scores; and
   providing the bundle for presentation to the user based at least in part on the ranking of the bundle score.

5. A computer-implemented method, comprising:
   partitioning, by a computer system, a plurality of items into a plurality of item concepts such that each item of the plurality of items is assigned to one and only one item concept of the plurality of item concepts, the plurality of item concepts partitioned according to a non-hierarchical taxonomy;
   receiving, by the computer system, a first list of co-selected items, each selected item of the first list corresponding to an item concept of the plurality of item concepts;
   determining, by the computer system and based at least in part on the first list, an item concept relatedness score that corresponds to a relatedness between a first item concept of the plurality of item concepts and a second item concept of the plurality of item concepts;
   receiving, by the computer system from a user of a plurality of users, a selection of a first item assigned to the first item concept;
   determining, by the computer system based at least in part on the item concept relatedness score, that a second item assigned to the second item concept should be provided for presentation to the user in response to the selection, the second item being presented in association with the first item within a bundle via a user interface of a user device of the user based at least in part on the item concept relatedness score such that there is a reduction of memory and/or processor utilization for at least one of the user device or the computer system;
   receiving, by the computer system, a selection of the bundle via the user interface of the user device; and
   determining, by the computer system, an instruction to combine both the first item and the second item into a same package for shipment to the user.

6. The computer-implemented method of claim 5, wherein the first list of co-selected items corresponds to a plurality of co-acquisitions of items, each co-acquisition of the plurality corresponding to an acquisition of at least two items of the plurality of items.

7. The computer-implemented method of claim 5, wherein the item concept relatedness score is determined based at least in part on computing a conditional probability that the second item concept will be selected, given that the first item concept is selected.

8. The computer-implemented method of claim 5, wherein the second item corresponds to a new item recently added to the plurality of items, such that a number of appearances of the second item in the first list does not match a predetermined threshold value.

9. The computer-implemented method of claim 5, the method further comprising:
   determining, by the computer system and based at least in part on the first list, a second item concept relatedness score that corresponds to a relatedness between the first item concept of the plurality of item concepts and a third item concept of the plurality of item concepts; and
   determining, by the computer system based at least in part on the second item concept relatedness score, that a third item assigned to the third item concept should be excluded from presentation to the user in response to the selection.

10. The computer-implemented method of claim 9, wherein the first item corresponds to a search query, and the third item is excluded from presentation in a search results based at least in part on the second item concept relatedness score being below a threshold value.

11. The computer-implemented method of claim 10, the method further comprising:
    receiving, by the computer system, a plurality of training data samples, a training data sample of the plurality of training data samples including at least: (1) a previous search query, and (2) an item acquisition resulting from the previous search query, the acquired item assigned to an item concept of the plurality of item concepts;
    training, by the computer system, a machine learning model based at least in part on the plurality of training data samples, the machine learning model trained to output the second item concept relatedness score corresponding to a relatedness between the search query and the third item concept; and
    inputting, by the computer system, the search query into the trained machine learning model for generation of the second item concept relatedness score.

12. The computer-implemented method of claim 11, wherein the machine learning model is a neural network.

13. The computer-implemented method of claim 5, wherein the second item is selected for presentation based at least in part on the second item concept being the same as the first item concept, and wherein the second item is presented alongside the first item as a potential substitute item.

14. The computer-implemented method of claim 5, wherein the plurality of item concepts is represented as a non-hierarchical list of item concepts, each item concept of the plurality having a unique item concept identifier.

15. The computer-implemented method of claim 5, further comprising:
    including, by the computer system and based at least in part on the item concept relatedness score, the first item and the second item together in a bundle; and
    providing, by the computer system, the bundle for presentation to the user.

16. A non-transitory computer readable medium storing specific computer-executable instructions that, when executed by a processor, cause a computer system to at least:
    partition a plurality of items into a plurality of item concepts such that each item of the plurality of items is assigned to one and only one item concept of the plurality of item concepts, the plurality of item concepts partitioned according to a non-hierarchical taxonomy;
    receive a first list of co-selected items, each selected item of the first list corresponding to an item concept of the plurality of item concepts;
    determine, based at least in part on the first list, an item concept relatedness score that corresponds to a relatedness between a first item concept of the plurality of item concepts and a second item concept of the plurality of item concepts;
    receive, from a user of a plurality of users, a selection of a first item assigned to the first item concept;

determine, based at least in part on the item concept relatedness score, that a second item assigned to the second item concept should be provided for presentation to the user in response to the selection, the second item being presented in association with the first item within a bundle via a user interface of a user device of the user based at least in part on the item concept relatedness score such that there is a reduction of memory and/or processor utilization for at least one of the user device or the computer system;

receive a selection of the bundle via the user interface of the user device; and provide a recommendation to combine both the first item and the second item into a same package for shipment to the user.

17. The non-transitory computer readable medium of claim 16, wherein the instructions for determining the item concept relatedness score further comprises instructions for:

determining a probability of a second selection of the second item concept, given a first selection of the first item concept, wherein a selection of an item concept corresponds to selecting an item that is assigned to the item concept.

18. The non-transitory computer readable medium of claim 16, wherein the instructions for determining the item concept relatedness score further comprises instructions for:

generating an embedding based at least in part on the selection of the first item, the first item including multiple sub-elements, the embedding corresponding to a multidimensional data point representing a context for the multiple sub-elements within the first item; and inputting the embedding into a machine learning model that is trained to output the item concept relatedness score.

19. The non-transitory computer readable medium of claim 18, wherein the first item corresponds to a search query including a plurality of words, each word of the plurality corresponding to a sub-element of the multiple sub-elements, and wherein the machine learning model is a neural network.

20. The non-transitory computer readable medium of claim 16, wherein the plurality of items is represented within a hierarchical taxonomy, and wherein partitioning the plurality of items into the plurality of item concepts includes generating a non-hierarchical taxonomy represented by the plurality of item concepts.

21. An e-commerce computer system, comprising:

one or more processors;

a memory for storing data and instructions that, when executed with the one or more processors, cause the e-commerce computer system to, at least:

receive a query from a customer about an item for purchase;

analyze a hierarchically organized item catalog represented as nodes associated with attributes of items for purchase, wherein at least some of the nodes include an item concept attribute such that all child nodes of a node of the at least some nodes are assigned to the node based at least in part on the item concept attribute, and wherein the at least some nodes are represented in a non-hierarchical list;

determine the node based at least in part on the item, the item assigned to the node based at least in part on the item concept attribute;

determine item concept relatedness scores between the item concept attribute of the node and other item concept attributes of other nodes of the at least some nodes;

include other items with the item together in a bundle based at least in part on the item concept relatedness scores;

provide the bundle for presentation of the item together with the other items via a user interface of a user device of the customer such that there is a reduction of memory and/or processor utilization for at least one of the user device or the computer system;

receive a selection of the bundle via a user interface of the user device; and determine an instruction to combine the other items and the item into a same package for shipment to the user.

\* \* \* \* \*